United States Patent
Park et al.

(10) Patent No.: US 10,713,202 B2
(45) Date of Patent: Jul. 14, 2020

(54) QUALITY OF SERVICE (QOS)-AWARE INPUT/OUTPUT (IO) MANAGEMENT FOR PERIPHERAL COMPONENT INTERCONNECT EXPRESS (PCIE) STORAGE SYSTEM WITH RECONFIGURABLE MULTI-PORTS

(71) Applicant: Samsung Electronics Co., Ltd., Suwon-si, Gyeonggi-do (KR)

(72) Inventors: Heekwon Park, Pleasanton, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 196 days.

(21) Appl. No.: 15/227,959

(22) Filed: Aug. 3, 2016

(65) Prior Publication Data

US 2017/0344506 A1 Nov. 30, 2017

Related U.S. Application Data

(60) Provisional application No. 62/341,602, filed on May 25, 2016.

(51) Int. Cl.
*G06F 13/40* (2006.01)
*G06F 13/28* (2006.01)
*G06F 13/42* (2006.01)

(52) U.S. Cl.
CPC .......... *G06F 13/4022* (2013.01); *G06F 13/28* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,825,684 B2 | 11/2010 | Hutchings | |
| 7,937,532 B2 | 5/2011 | Kunze et al. | |
| 8,874,833 B1 * | 10/2014 | Gole | G06F 12/0246 |
| | | | 711/103 |
| 9,432,298 B1 * | 8/2016 | Smith | H04L 49/9057 |
| 9,639,473 B1 * | 5/2017 | Adda | G06F 12/0888 |

(Continued)

FOREIGN PATENT DOCUMENTS

WO 2008017872 A1 2/2008

*Primary Examiner* — Henry Tsai
*Assistant Examiner* — Christopher A Bartels
(74) *Attorney, Agent, or Firm* — Renaissance IP Law Group LLP

(57) ABSTRACT

Embodiments of methods and systems for quality of service (QoS)-aware input/output (IO) management for a Peripheral Component Interconnect Express (PCIe) storage system with reconfigurable multi-ports are described. In an embodiment, a method includes receiving, in a receiver interface, an IO request from a software application, the IO request comprising information for communicating data over a data access port. The method may also include determining, in a transfer mode selector, a transfer mode selection for communicating the data over the data access port, the transfer mode being selected from a throughput-oriented mode, a latency-sensitive mode, or a balanced mode. Additionally, the method may include communicating, by a block distribution unit, the data over the data access port in response to the IO request, and according to the data transfer mode.

20 Claims, 12 Drawing Sheets

(56) References Cited

U.S. PATENT DOCUMENTS

| | | | |
|---|---|---|---|
| 2012/0151118 A1* | 6/2012 | Flynn | G06F 11/1008 711/6 |
| 2013/0311817 A1* | 11/2013 | Kim | G06F 1/04 713/501 |
| 2014/0189427 A1* | 7/2014 | Jayaprakash Bharadwaj | G06F 11/1415 714/15 |
| 2014/0198790 A1* | 7/2014 | Christenson | H04L 43/0811 370/392 |
| 2014/0359044 A1* | 12/2014 | Davis | H04L 45/60 709/213 |
| 2015/0180782 A1* | 6/2015 | Rimmer | H04L 69/22 370/236 |
| 2015/0269091 A1 | 9/2015 | Horovitz et al. | |
| 2016/0034407 A1* | 2/2016 | Shankar | G06F 13/28 710/22 |
| 2016/0378545 A1* | 12/2016 | Ho | G06F 9/50 718/107 |
| 2017/0091108 A1* | 3/2017 | Arellano | G06F 12/0888 |
| 2017/0206166 A1* | 7/2017 | Kumar | G06F 12/0888 |
| 2017/0269944 A1* | 9/2017 | Pelissier | G06F 9/4416 |

* cited by examiner

QUALITY OF SERVICE (QOS)-AWARE INPUT/OUTPUT (IO) MANAGEMENT FOR PERIPHERAL COMPONENT INTERCONNECT EXPRESS (PCIE) STORAGE SYSTEM WITH RECONFIGURABLE MULTI-PORTS

RELATED APPLICATION DATA

This application claims the priority benefit under 35 U.S.C. §119(e) of U.S. Patent Application Ser. No. 62/341,602, filed May 25, 2016, which is hereby incorporated by reference.

FIELD

This disclosure relates generally to data handling systems, and more specifically, to quality of service (QoS)-aware input/output (IO) management for a peripheral component interconnect express (PCIe) storage system with reconfigurable multi-ports.

BACKGROUND

Data handling systems, such as computer systems, generally include a host system with several core components, including a central processing unit (CPU), a memory device, IO devices, and a device interconnect or root complex for transferring information between components of the host system. One interconnect protocol is PCIe, which defines modes of data transfer between host system components.

Direct memory access (DMA), direct cache access (DCA), and data direct I/O (DDIO) are existing techniques to transfer data between host systems (memory or caches) and IO devices. DMA transfers data between IO devices and host system memory. DDIO transfers data between IO devices and the last level cache (LLC) of a host CPU. DCA transfers data between IO devices and host system memory just like DMA, but after the data transfer is complete, DCA prefetches the data to the CPU caches from memory.

Host systems often include multiple data handling ports, each of which may be configured to transfer data by one of DMA, DCA or DDIO protocols. Such ports are referred to herein as "multi-ports." A common system may have some multi-ports configured for DMA, some multi-ports configured for DDIO, and possibly some multi-ports configured for DCA. Existing system software sends an IO request to devices using one of these techniques (DMA, DCA, or DDIO). However, there are currently no methods to combine functional aspects of DMA, DCA, or DDIO protocols, or to dynamically switch between protocols for multiplexing, QoS control, or cache flow-control.

SUMMARY

Embodiments of methods and systems for QoS-aware IO management for a PCIe storage system with reconfigurable multi-ports are described. In an embodiment, a method includes receiving, in a receiver interface, an IO request from a software application, the IO request comprising information for communicating data over a data access port. The method may also include determining, in a transfer mode selector, a transfer mode selection for communicating the data over the data access port, the transfer mode being selected from a throughput-oriented mode, a latency-sensitive mode, or a balanced mode. Additionally, the method may include communicating, by a block distribution unit, the data over the data access port in response to the IO request, and according to the data transfer mode.

An embodiment of a system may include a data communication controller. The data communication controller may include a receiver interface configured to receive an Input/Output (IO) request from a software application, the IO request comprising information for communicating data over a data access port. Additionally, the data communication controller may include a transfer mode selector coupled to the receiver interface and configured to determine a transfer mode selection for communicating the data over the data access port, the transfer mode being selected from a throughput-oriented mode, a latency-sensitive mode, or a balanced mode. The data communication controller may also include a block distribution unit configured to communicate the data over the data access port in response to the IO request, and according to the data transfer mode. The system may also include a data access port coupled to the data communication controller, the data access port configured to communicate the data to a peripheral device over a peripheral component interconnect bus.

An embodiment of an apparatus may include a receiver interface configured to receive an Input/Output (IO) request from a software application, the IO request comprising information for communicating data over a data access port. The apparatus may also include a transfer mode selector coupled to the receiver interface and configured to determine a transfer mode selection for communicating the data over the data access port, the transfer mode being selected from a throughput-oriented mode, a latency-sensitive mode, or a balanced mode. Additionally, the apparatus may include a block distribution unit configured to communicate the data over the data access port in response to the IO request, and according to the data transfer mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for QoS-aware IO management for a PCIe storage system with reconfigurable multi-ports are described. Described embodiments may improve performance of certain data handling systems. Data handling systems may include, but are not limited to, personal computing devices, such as, computer work stations, laptop computers, tablet computers, personal data assistants, smartphones, and the like. Other embodiments may be used in conjunction with enterprise data handling systems, such as servers, storage controllers, cloud server farms and data farms, and other enterprise data center systems and components.

The described embodiments provide a logical device interface to applications operating in association with a host system. In an embodiment, the logical device combines multiple physical ports with selectable data transfer capabilities and QoS into multiple data paths. The data paths may be configured according to one of multiple data transfer modes, including a "throughput booster mode," a "swift mode," and a "balanced mode." In an embodiment, the throughput booster mode transfers all data across ports configured for DMA data transfers. In an embodiment, the swift mode transfers all data across ports configured for DDIO data transfers. In an embodiment, the balanced mode switches between DMA ports and DDIO ports, depending on an inspected data characteristic. Additionally, the present embodiments describe multiplexing for data paths based on QoS requirements in the balanced mode, where IO blocks are grouped and transmitted according to a set of DMA or DDIO ports, depending upon QoS requirements and the data characteristics. Further, the present embodiments include methods for flow control to prevent overflow of the CPU cache when using DDIO ports.

One of ordinary skill will recognize various advantages and benefits of the present embodiments. In particular, the QoS benefits, including system latency reduction, may be recognized in comparison to prior systems. Additionally, system throughput may be improved according to some embodiments. Furthermore, cache overflow may be prevented in certain embodiments, when compared with previous DDIO or DCA techniques. Although the present embodiments are described specifically with reference to PCIe, one of ordinary skill will recognize additional or alternative systems to which the present embodiments may be adapted, so long as the selected data transfer protocol provides access between a data port, a memory and a processor cache.

Figure 1:
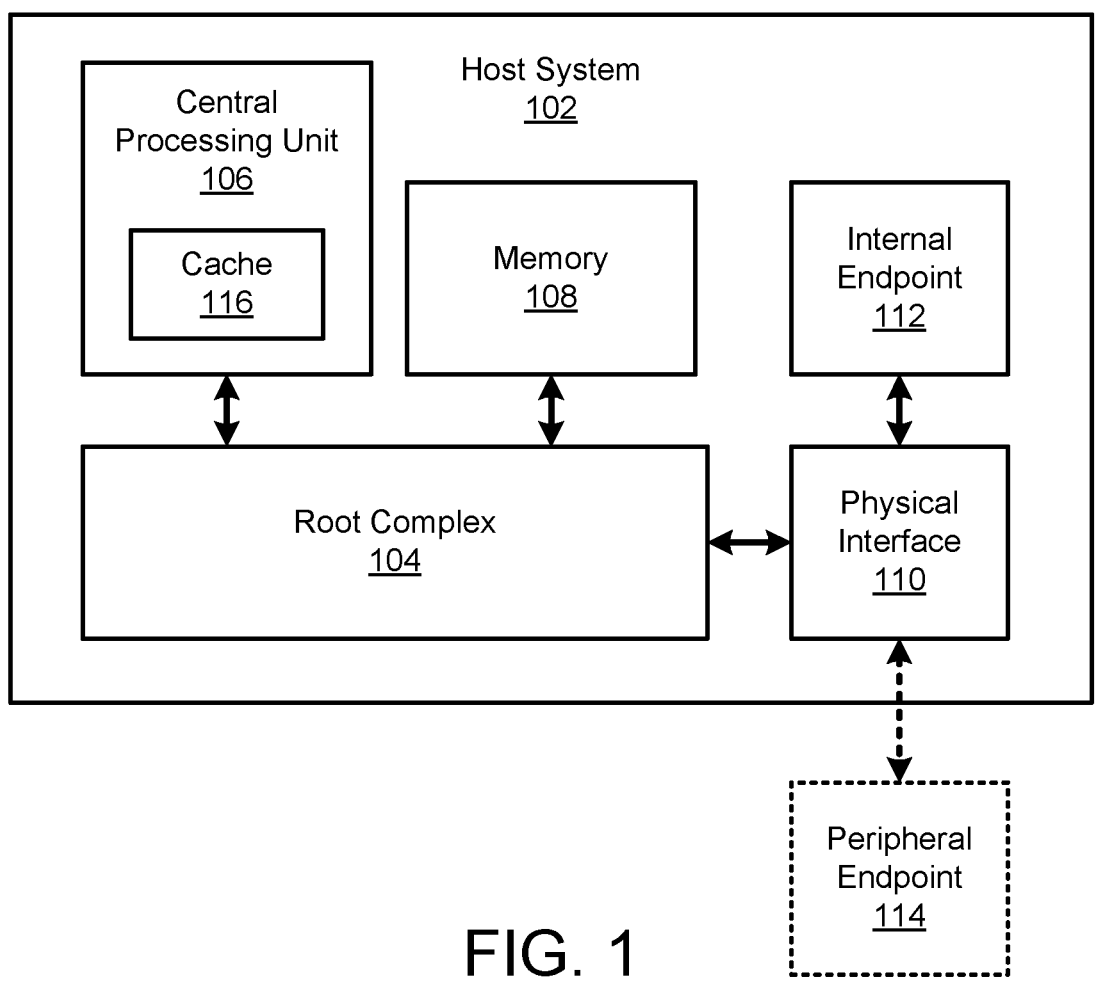
FIG. 1 is a schematic block diagram illustrating an embodiment of a system for QoS-aware 10 management for a PCIe storage system with reconfigurable multi-ports.

FIG. 1 is a schematic block diagram illustrating an embodiment of a system 100 for QoS-aware IO management for a PCIe storage system with reconfigurable multi-ports. In an embodiment, the system 100 includes a host system 102, and optionally, one or more peripheral endpoints 114. A host system 102 may be, for example, a data handling device, such as a computer. A peripheral endpoint may be a peripheral device configured to communicate with the host system 102 over a PCIe, or similar data bus. Examples may include, but are not limited to, PCIe extension devices, data storage devices, server blades, etc.

Figure 4:
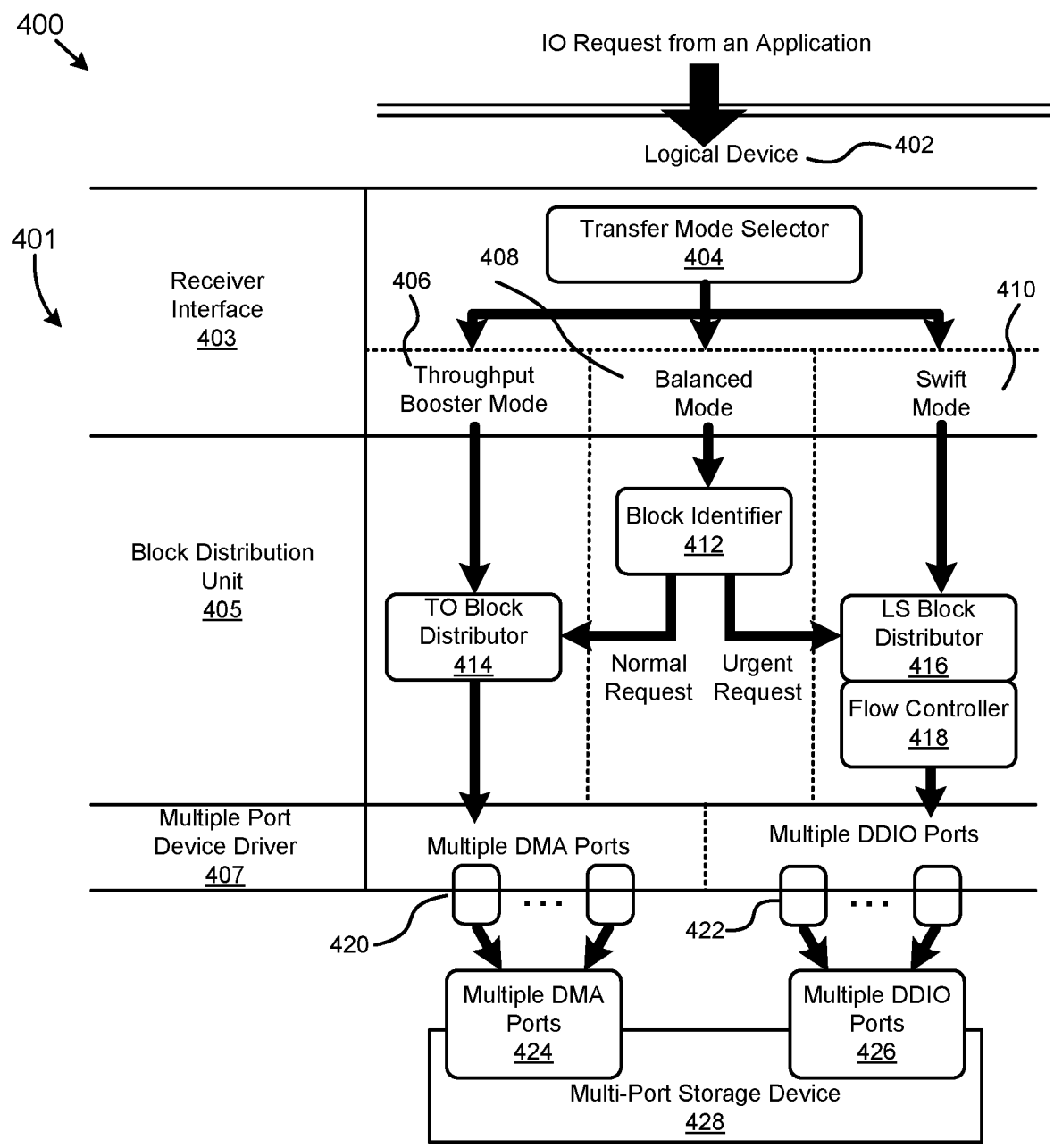
FIG. 4 is a logical diagram illustrating an embodiment of a system specially configured for QoS-aware IO management for a PCIe storage system with reconfigurable multi-ports.

In an embodiment, the host system 102 may include a root complex 104 which forms a data communication fabric for communicating data between the CPU 106, the memory 108 and one or more internal endpoints 112 or external endpoints 114 coupled to the root complex 104 via a physical interface 110. The root complex 104 may operate according to a data communication protocol, such as, but not limited to, PCIe. In an embodiment, the root complex 104 and/or the physical interface 110 may include a plurality of data communication ports as illustrated in FIG. 4. The various endpoints 112, 114 may communicate data with the CPU 106 and/or the memory 108 via the root complex 104. In an embodiment, the CPU 106 may include, or be externally coupled to, a cache 116. One embodiment of a cache 116 is an LLC.

Figure 2:
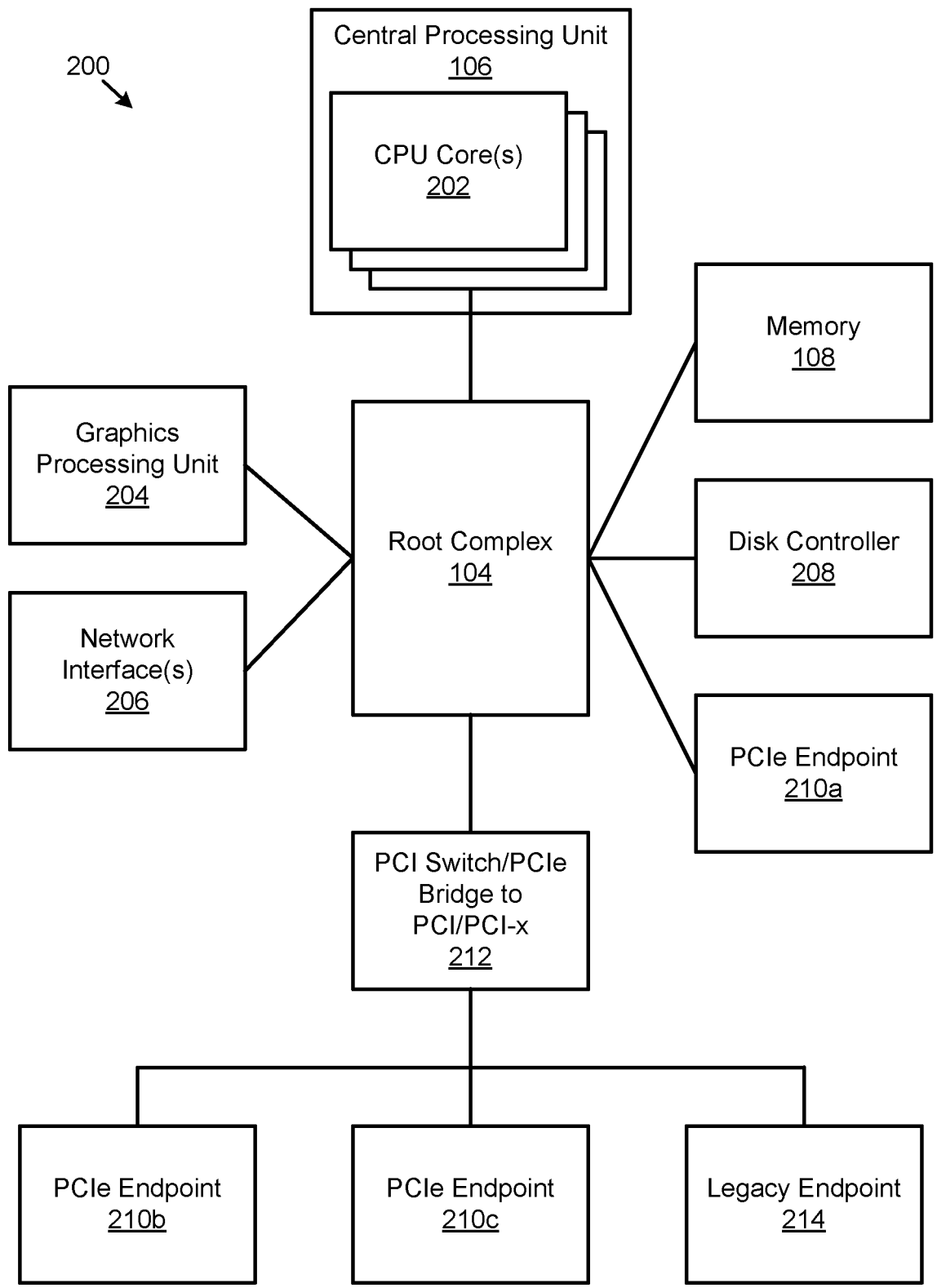
FIG. 2 is a schematic block diagram illustrating an embodiment of a system for QoS-aware 10 management for a PCIe storage system with reconfigurable multi-ports.

FIG. 2 is a schematic block diagram illustrating another embodiment of a system 200. In an embodiment, the CPU 106 may include a plurality of CPU cores 202. System 200 may similarly include a root complex 104 for communicating the data between the CPU cores 202, the memory 108, and the one or more endpoints. The term "endpoints" may include the internal endpoints 112 and the external endpoints 114 illustrated in FIG. 1. Examples of endpoints may include a Graphics Processing Unit 204, one or more network interfaces 206, a disk controller 208, and other PCIe endpoints 210*a*. Additionally, the system 200 may include a PCI switch/PCIe bridge to PCI/PCI-x 212. In some alternative embodiments, the PCI switch may be separate from the PCIe bridge. The PCI switch may provide switched communication to a plurality of PCIe endpoints 210*b-c*. The PCIe bridge may provide connectivity to legacy endpoints 214 operating according to a legacy PCI or PCI-x protocol.

Figure 3:
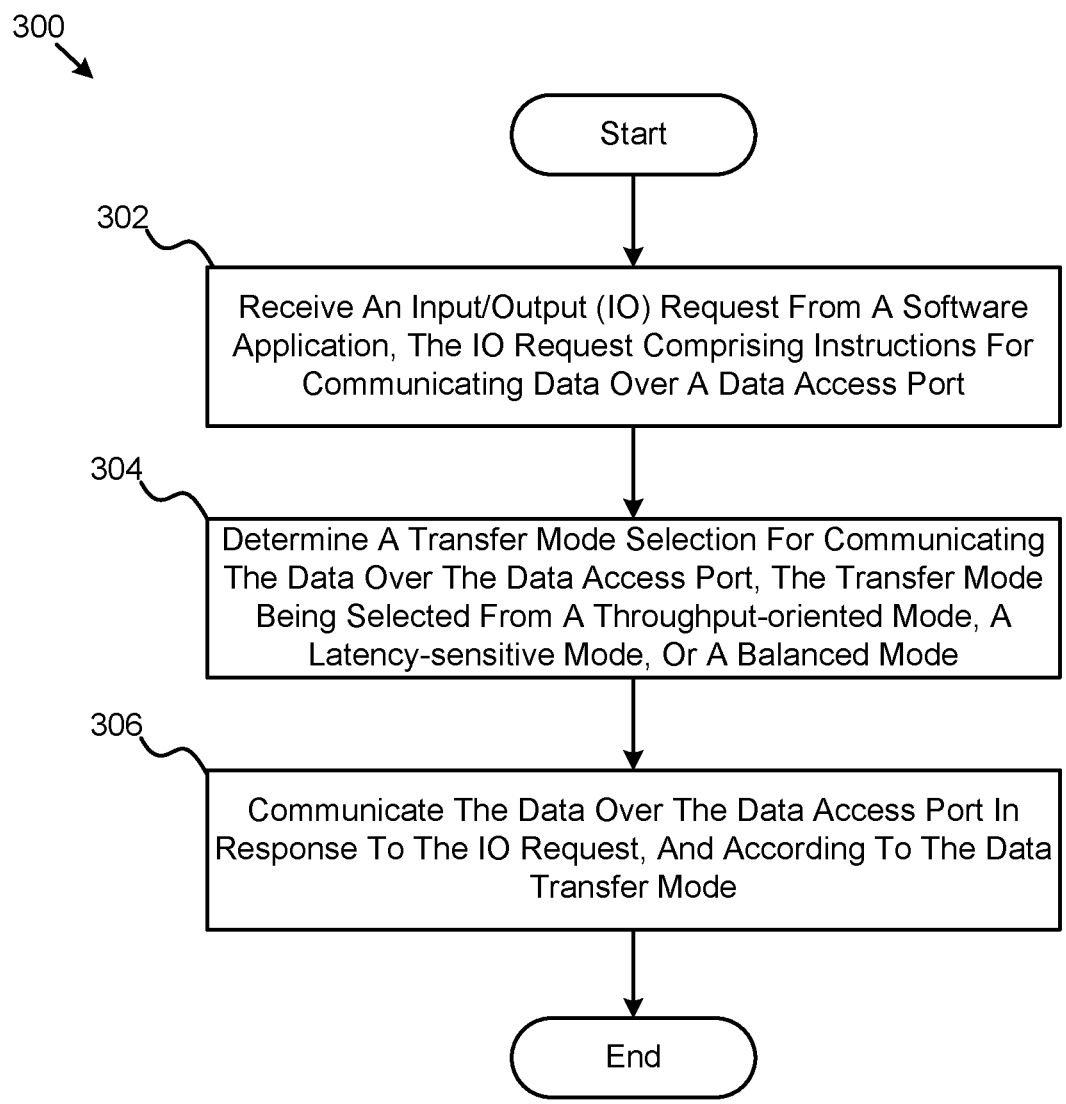
FIG. 3 is a schematic flowchart diagram illustrating an embodiment of a method for QoS-aware IO management for a PCIe storage system with reconfigurable multi-ports.

FIG. 3 is a schematic flowchart diagram illustrating an embodiment of a method 300 for QoS-aware IO management for a PCIe storage system with reconfigurable multi-ports. In an embodiment, the method 300 starts with receiving an IO request from a software application, where the IO request includes information or instructions for communicating the data over a data access port, as shown at block 302. At block 304, the method includes determining a transfer mode selection for communicating the data over the data access port. The transfer mode may be selected from a group of transfer modes, including: a throughput-oriented mode, a latency-sensitive mode, and a balanced mode. At block 306, the method includes communicating the data over the data access port in response to the IO request, and according to the data transfer mode.

FIG. 4 is a logical diagram illustrating an embodiment of a system 400 that is specially configured for QoS-aware IO management for a PCIe storage system with reconfigurable multi-ports. In an embodiment, aspects of the system 400 may be programmed into components of the root complex 104, or other PCIe control components. System software or firmware modules may present a logical device 402 for use by an application. In one embodiment, the system 400 may include a data communication controller 401, which may include a receiver interface 403 with a transfer mode selector 404. Additionally, the data communication controller 401 may include a block distribution unit 405, having a TO block distributor 414 for handling DMA requests, an LS block distributor 416 for handling DDIO requests, and a block identifier 412 for switching blocks between the TO block distributor 414 and the LS block distributor 416, depending upon a value of the data characteristic. The data communication controller 401 may also include a multiple port device driver 407 configured to operate multiple DMA ports 420 and/or multiple DDIO ports 422.

In an embodiment, ports connected to a storage endpoint, such as the multi-port storage device 428, may present a logical storage component for use by an application. In an embodiment, the system 400 includes a receiver interface for receiving the IO requests from the application. The receiver interface 403 may include a transfer mode selector 404. The transfer mode selector 404 may select between one of a plurality of data transfer modes. Examples of data transfer modes include a throughput booster mode 406, a swift mode 410, and a balanced mode 408.

In an embodiment, the throughput booster mode 406 may allow the application to transfer data to a memory device 108. Such an embodiment may provide enhanced data throughput. In an embodiment, the swift mode 410 may provide the application with rapid data communication with the CPU 106 by communicating the data to a cache 116, such as an LLC or other cache, associated with one or more of the CPU cores 202. The balanced mode 408 may selectably communicate the data to either the memory 108 or the cache 116 based on a data characteristic communicated from the application.

In such an embodiment, a data block is received in an IO request from the application. The transfer mode selector 404 identifies a transfer mode to be applied. In one embodiment, the transfer mode selector 404 may select the transfer mode in response to information, such as the data characteristic, in the IO request. In another embodiment, the transfer mode selector 404 may select the transfer mode in response to a determination of whether DMA ports are available or DDIO ports are available. In still a further embodiment, the transfer mode selector 404 may determine the transfer mode in response to a predetermined QoS protocol, rule, or load balancing sequence. One of ordinary skill may recognize a variety of criteria that may be used by the transfer mode selector 404 to determine the transfer mode to be used for a particular IO request. In yet another embodiment, the transfer mode selector 404 may determine the transfer mode according to a timing or packet count rule.

The transfer mode selector 404 may transfer the data block to the block distribution unit 405. In an embodiment, the block distribution unit 405 may include a throughput oriented (TO) block distributor 414, a latency-sensitive (LS) block distributor 416, a block identifier 412, and a flow controller 418.

If the throughput booster mode 406 is selected, the data block may be passed to the TO block distributor 414. The TO block distributor 414 may divide the request block into a plurality of sub-blocks, each sub-block being passed to one or more DMA ports 420 configured to transfer data over a DMA protocol to memory 108. In some embodiments, one or more DMA ports 420 may be defined at system startup, for example by the multiple port device driver or by the system's basic input/output system (BIOS). Similarly, one or more DDIO ports may be defined at system startup. In an alternative embodiment, one or more DMA ports 420 may be reconfigured as DDIO ports 422 dynamically during operation, and in response to the IO request.

In swift mode 410, the data block may be communicated to the LS block distributor 416, which then passes the data block, or sub-blocks, to the DDIO ports 422. In a further embodiment, a flow controller 418 may meter the flow of data blocks, or sub-blocks, to the DDIO ports in order to prevent overflow or pollution of the cache 116 associated with the CPU 106. Embodiments of flow control methods are described below with respect to FIGS. 10-12. In an embodiment, the multi-port storage device 420 may include multiple DMA ports 424 and/or multiple DDIO ports 426 configured to pass data to components of the multi-port storage device 428.

In an embodiment, the balanced mode 408 may selectably pass data blocks to either the TO block distributor 414 for communication over DMA ports 420, or to the LS block distributor 416 for communication over the DDIO ports 422. In such an embodiment, the block identifier 412 may inspect a data characteristic for a data block, and determine whether to pass the data block to the TO block distributor 414 or to the LS block distributor 416, depending upon the data characteristic. In an embodiment, the data characteristic may be an urgency identifier set by the application. For example, the data characteristic characterizes the data block as urgent or non-urgent. In such an embodiment, the urgent data block may be passed to the LS block distributor 416 and a non-urgent data block may be passed to the TO block distributor 414.

In an embodiment, the data characteristic may be a tag, or metadata associated with the data block. Alternatively, the data characteristic may be a bit set within the data block. In still another embodiment, the data characteristic may be inherently derived in response to the user, or application providing the data block, or in response to the type of data block provided. In another embodiment, some users or applications may generate urgent data blocks, and others may generate non-urgent data blocks. In one embodiment, a user requested block may be urgent because the user may access the block as soon as the block is ready to access and a pre-fetch block may be non-urgent because the block may or may not be accessed in the near future. One of ordinary skill will recognize additional or alternative data characteristics, which may be used by the block identifier 412 to determine whether to send the data block to the TO block distributor 414 or to the LS block distributor 416.

Figure 5:
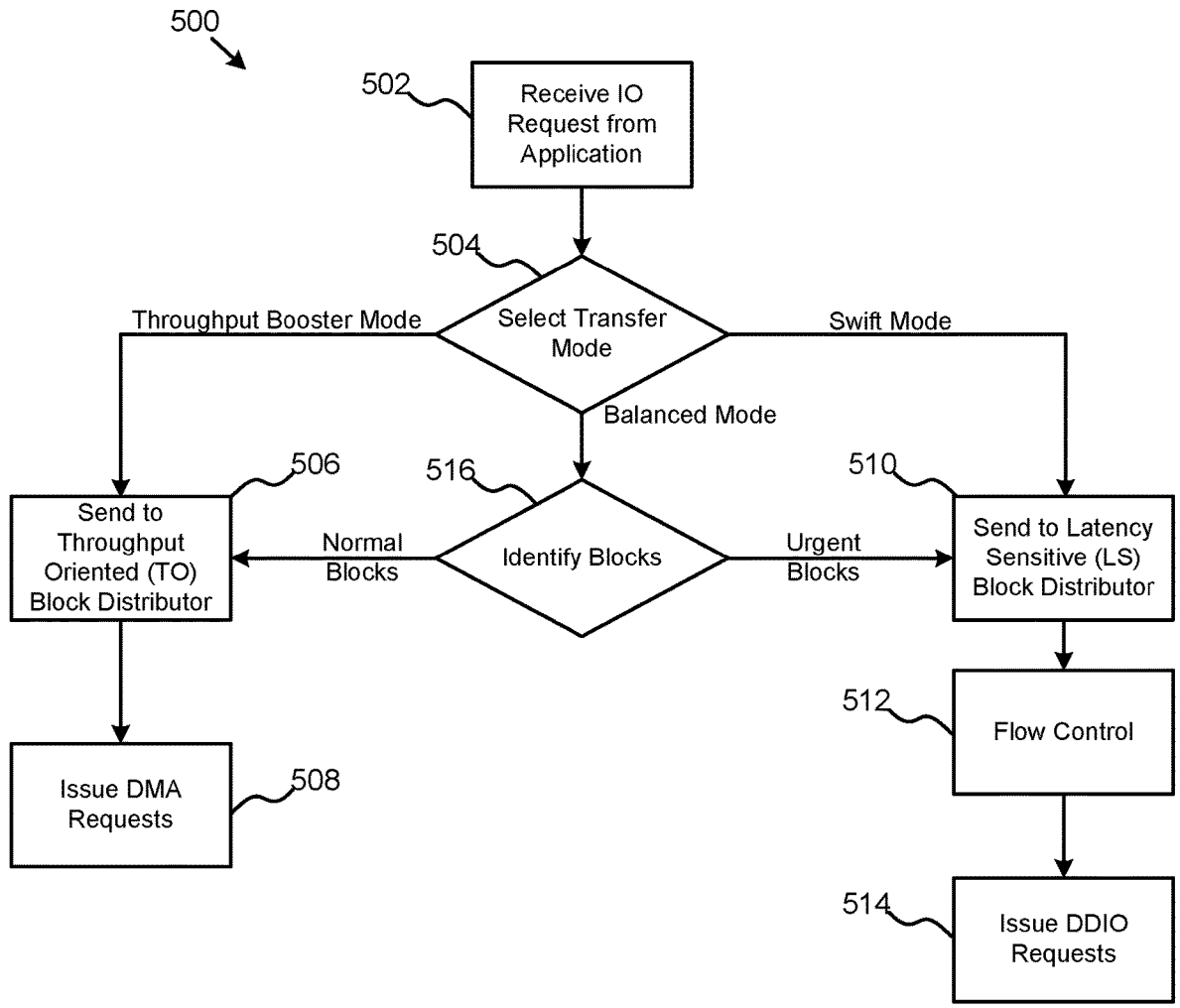
FIG. 5 is a schematic flowchart diagram illustrating an embodiment of a method for QoS-aware IO management for a PCIe storage system with reconfigurable multi-ports.

FIG. 5 shows a flowchart which describes the method 500 performed by the structure of FIG. 4. In such an embodiment, the method 500 includes receiving an IO request from an application as shown at block 502. At block 504, the transfer mode selector 404 may select a transfer mode based on the data characteristic as shown at block 504. If all ports are set as DMA ports 420, then the throughput booster mode 406 is selected and all data blocks are sent to the TO block distributor 414. If all ports are set as DDIO ports 422, then the swift mode 410 is selected and all data blocks are directed to the LS block distributor 416. If a portion of the ports are set as DMA ports 420 and a portion of the ports are set as DDIO ports 422, then a balanced mode may be selected at block 504. In another embodiment, all the ports need not be set as one type or another. A throughput request may simply send requests to the subset of ports that are DMA, leaving the DDIO ports unused. In such embodiments, the data blocks may be passed to the block identifier 412 for identification of blocks at block 516. "Normal" or "non-urgent" blocks may be passed to the TO block distributor 414 as shown at block 506. Urgent blocks may be passed to the LS block distributor 416 as shown at block 510. At block 512, a flow control process may be performed and DDIO requests may be issued at block 514. Alternatively, DMA requests may be issued at block 508.

Figure 6:
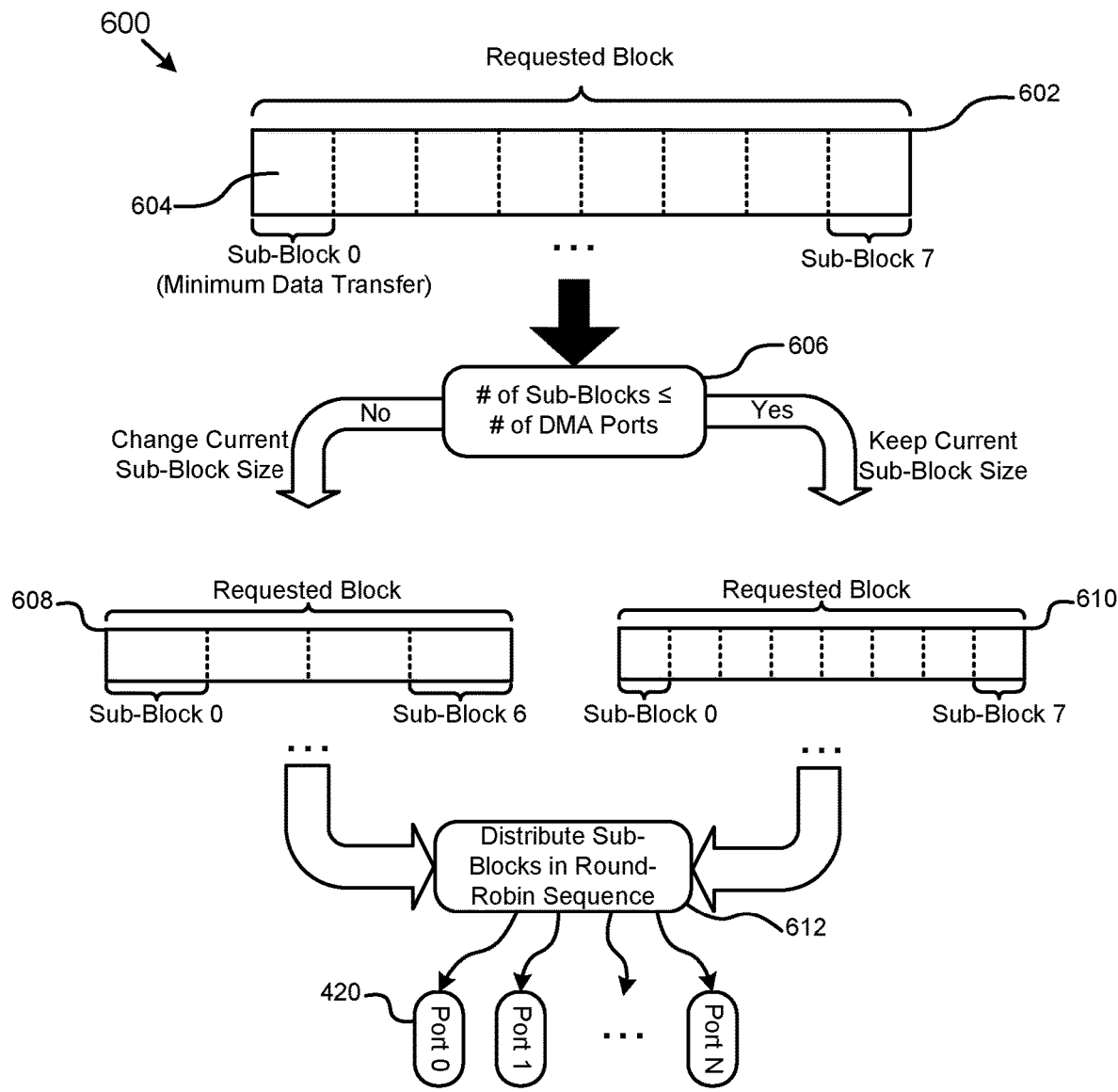
FIG. 6 is a logical diagram illustrating an embodiment of a method for data multiplexing in a system for QoS-aware IO management for a PCIe storage system with reconfigurable multi-ports.

FIG. 6 is a logical diagram illustrating an embodiment of a process 600 for data multiplexing in a system for QoS-aware IO management for a PCIe storage system with reconfigurable multi-ports. In one embodiment, the process of FIG. 6 may be carried out by the TO block distributor 414, or an associated component in the DMA transfer path. In an embodiment, the requested data block 602 may be received and inspected. The data block 602 may be divided into a number of sub-blocks 604 (e.g., eight (8) or more sub-blocks). At block 606, a determination may be made with respect to sub-block size. For example, if the number of sub-blocks 604 in the data block 602 is less than, or equal to, the number of DMA ports 420 available to communicate the sub-blocks 602, then the current size of each sub-block 604 may be maintained. However, if it is determined at block 606 that the number of sub-blocks 604 is greater than the number of DMA ports 420 available to transfer the sub-blocks 604, then the size of each sub-block 604 may be adjusted, and the total number of sub-blocks may be reduced. For example, a first result 610, corresponding to the case where the number of sub-blocks 604 is less than, or equal to, the number of DMA ports 420, may have the same sub-block configuration as the originally requested data block 602. The second result 608 may have fewer sub-blocks, each sub-block being larger in size for communication over a DMA port 420.

Figure 7:
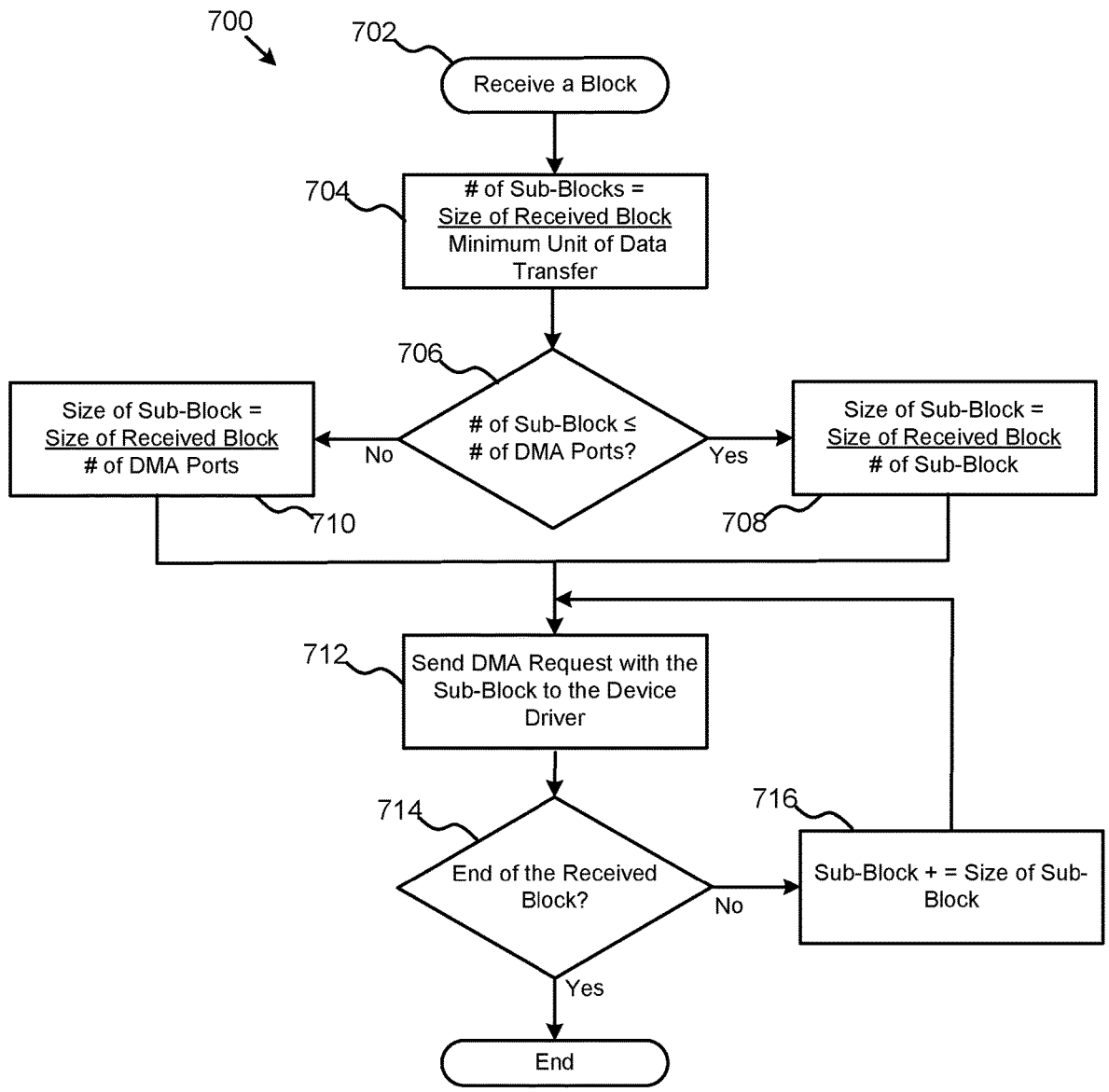
FIG. 7 is a schematic flowchart diagram illustrating an embodiment of a method for QoS-aware IO management for a PCIe storage system with reconfigurable multi-ports.

FIG. 7 is a schematic flowchart diagram illustrating an embodiment of the process described in FIG. 6. In the embodiment of FIG. 7, the method 700 includes receiving a data block at 702. At 704, the method 700 includes calculating a number of sub-blocks included in the received data block. The number of sub-blocks may be calculated as the size of the received data block divided by the minimum unit of data transfer. The result of such a calculation may be the identification of sub-blocks 604 in the original data block 602 as shown in FIG. 6.

In the method of FIG. 7, at 706, it is determined whether the number of sub-blocks is less than, or equal to, the number of available DMA ports 420. If yes, then the size of the sub-blocks equals the size of the received data block divided by the number of sub-blocks as shown at 708. If not, then the size of the sub-blocks is adjusted at 710. In such an embodiment, the size of the sub-blocks may be increased to the size of the requested block divided by the number of available DMA ports 420. In the example of FIG. 6, the second result 608 may be generated at 710.

Once the size of the sub-blocks has been determined at 708 or 710, then a DMA request is sent with a sub-block to the device driver as shown at block 712. If, at 714, it is determined that the end of the data block has been reached, then the process ends. If not, then the sub-block is incremented as shown at 716, and a next DMA request is sent at 712. This loop repeats until all of the sub-blocks in the data block have been sent over a DMA port 420.

Figure 8:
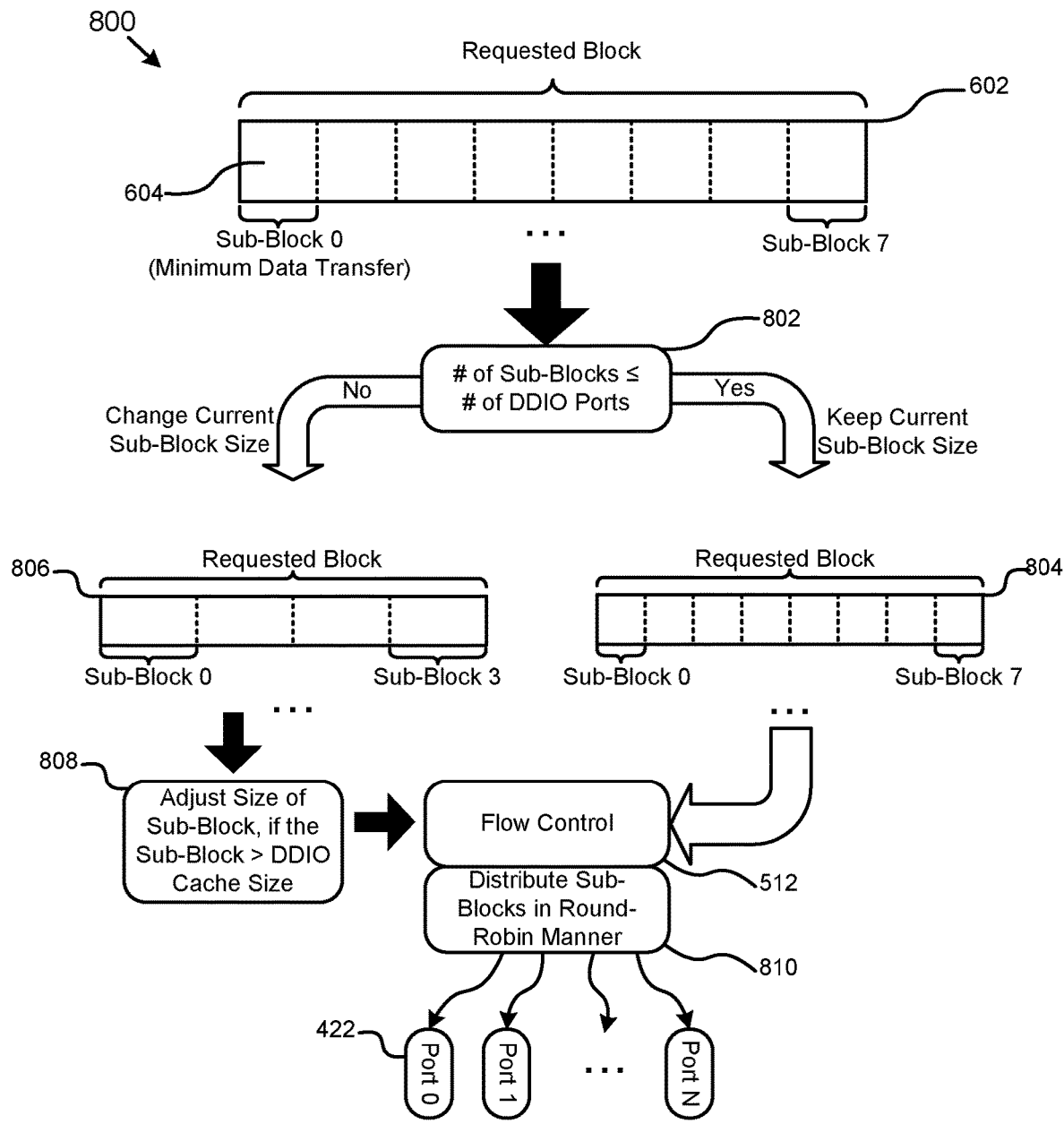
FIG. 8 is a logical diagram illustrating an embodiment of a method for data multiplexing in a system for QoS-aware IO management for a PCIe storage system with reconfigurable multi-ports.

FIG. 8 is a logical diagram illustrating an embodiment of a process 800 for data multiplexing in a system for QoS-aware IO management for a PCIe storage system with reconfigurable multi-ports. The embodiment of FIG. 8 illustrates an example of swift mode, where data blocks are sent over DDIO ports 422. The process 800 may be carried out, at least in part, by the LS block distributor 416 and the flow controller 418. As with the embodiment of FIG. 6, the process 800 starts with receiving a data block 602 for communication. The data block 602 may comprise several data blocks 604. At 802, it is determined whether the number of sub-blocks 604 is less than, or equal to, the number of DDIO ports 422 available for communicating the sub-blocks 604. If so, then a first results 804 includes the data blocks of the original size. If not, then a second result 806 includes resized data blocks, where the block size is modified to accommodate the number of DDIO ports available to communicate the sub-blocks. At 808, an additional step includes determining whether the size of the sub-block is greater than the DDIO cache size. If so, then the size is adjusted to accommodate the DDIO cache size requirements. At 512, a flow control operation is performed to prevent cache overrun or pollution. An example of a flow control process is described with reference to FIG. 12. At 810, the sub-blocks are distributed to the DDIO ports 422 according to a round-robin process.

Figure 9:
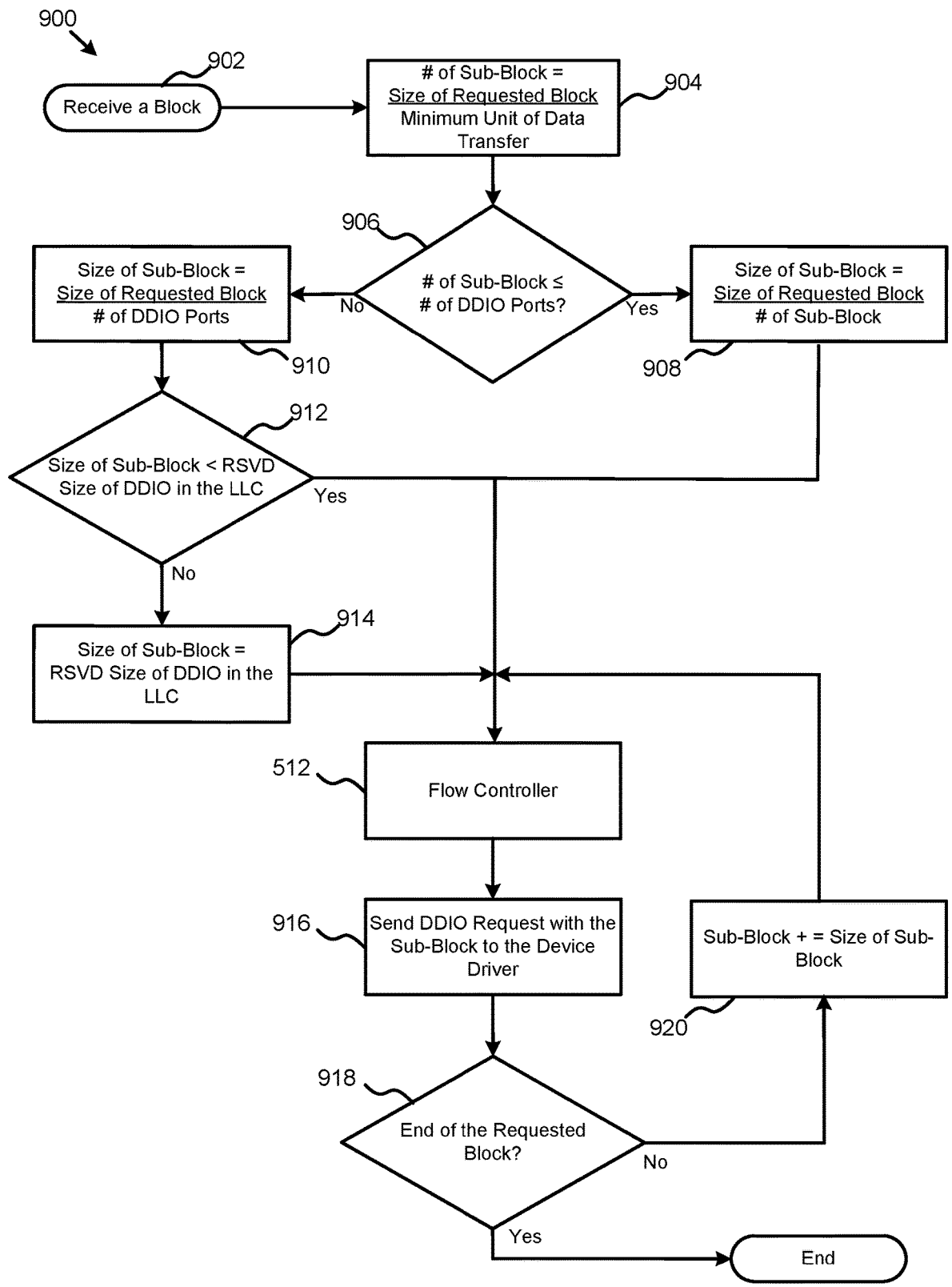
FIG. 9 is a schematic flowchart diagram illustrating an embodiment of a method for QoS-aware IO management for a PCIe storage system with reconfigurable multi-ports.

FIG. 9 is a schematic flowchart diagram illustrating an embodiment of the process described in FIG. 8. In the embodiment of FIG. 9, the method 900 includes receiving a data block at 902. At 904, the method 900 includes calculating a number of sub-blocks included in the received data block. The number of sub-blocks may be calculated as the size of the received data block divided by the minimum unit of data transfer. The result of such a calculation may be the identification of sub-blocks 604 in the original data block 602 as shown in FIG. 8.

In the method of FIG. 9, at 906, it is determined whether the number of sub-blocks is less than, or equal to, the number of available DDIO ports 422. If yes, then the size of the sub-blocks equals the size of the received data block divided by the number of sub-blocks as shown at 908. If not, then the size of the sub-blocks is adjusted at 910. In such an embodiment, the size of the sub-blocks may be increased to the size of the requested block divided by the number of available DDIO ports 422. In the example of FIG. 8, the second result 806 may be generated at 910.

In an embodiment, at 912, it is determined whether the size of the sub-block determined at 910 is less than the reserved size of the DDIO in the LLC. If so, then the flow control at 512 is performed. If not, then the sub-blocks are resized to be less than, or equal to, the reserved size of the DDIO in the LLC. And the flow control is performed at 512.

Once the size of the sub-blocks has been determined and flow control performed, then a DDIO request is sent with a sub-block to the device driver as shown at 916. If, at 918, it is determined that the end of the data block has been reached, then the process ends. If not, then the sub-block is incremented as shown at 920, and a next DDIO request is sent at 916. This loop repeats until all of the sub-blocks in the data block have been sent over a DDIO port 422.

Figure 10:
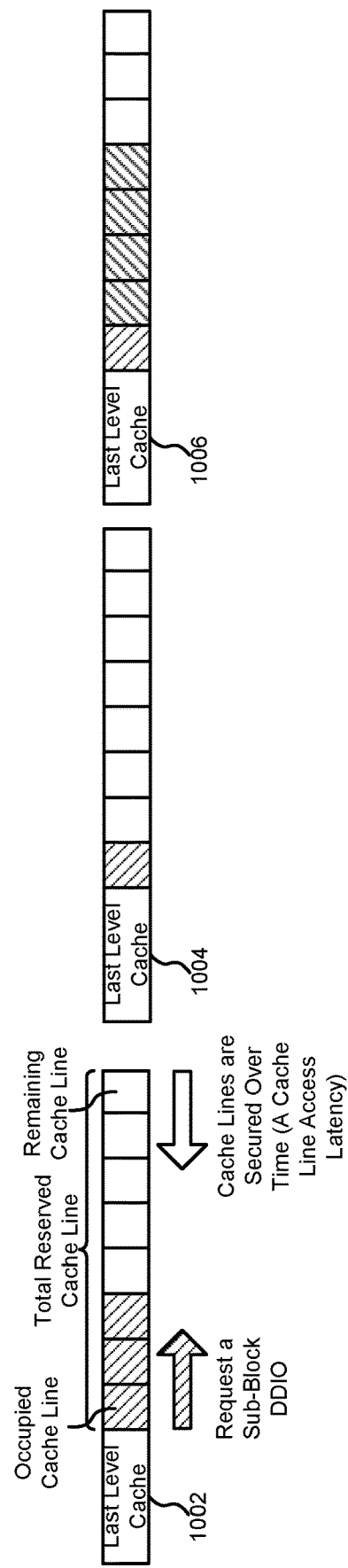
FIG. 10 is a logical diagram illustrating performance of a method for QoS-aware IO management for a PCIe storage system with reconfigurable multi-ports.

FIG. 10 is a logical diagram illustrating performance of a method for QoS-aware IO management for a PCIe storage system with reconfigurable multi-ports. FIG. 10 illustrates a cache 116, such as an LLC, associated with a CPU core 202. In the described embodiment, the LLC includes a plurality of cache lines (CL). Occupied cache lines are cache lines that contain data for retrieval by the CPU core 202. Remaining cache lines are unoccupied, or available, cache lines where newly received sub-blocks may be stored. The combination of the occupied cache lines and the remaining cache lines comprises the total reserved cache lines of the LLC.

FIG. 10 illustrates an example of three cache statuses. In a first status 1002, three cache lines are occupied by received data. In an embodiment, the cache line size is 64 bytes. The access latency of the LLC may be 100 ns, and the inter-request arrival time may be 200 ns, in one embodiment. Accordingly, for every request arrival, two additional cache lines may be secured by the CPU core 202 retrieving cache lines. Therefore, in a second status 1004, only one cache line is occupied. If a second request is received with a sub-block of 256 bytes of data, then four additional cache lines may be occupied, for a total of five occupied cache lines, as shown at the third status 1006.

Figure 11:
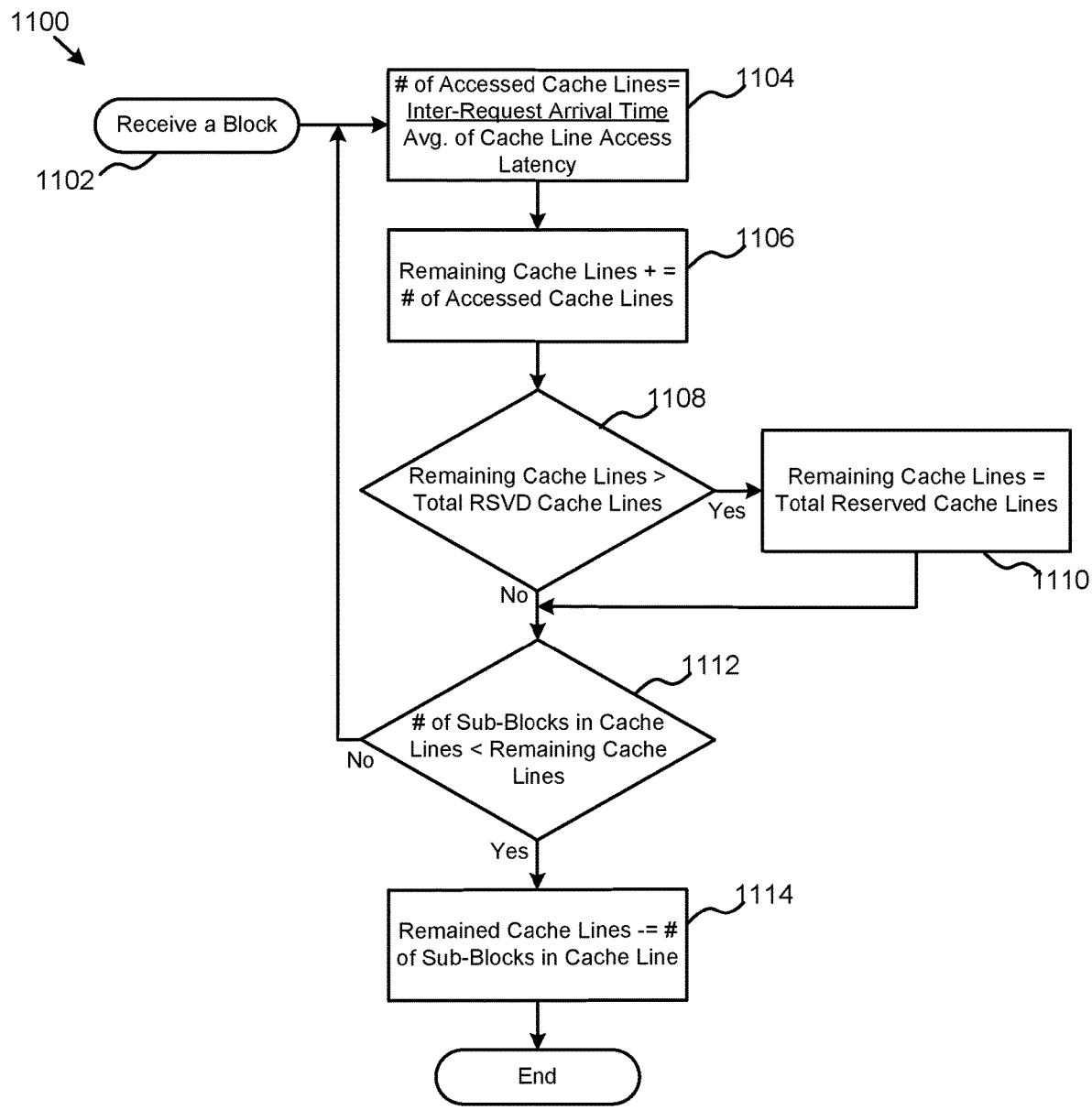
FIG. 11 is a schematic flowchart diagram illustrating an embodiment of a method for QoS-aware IO management for a PCIe storage system with reconfigurable multi-ports.

FIG. 11 is a schematic flowchart diagram illustrating an embodiment of a method for QoS-aware IO management for a PCIe storage system with reconfigurable multi-ports. Embodiments of the method 1100 for flow control may be performed, at least in part, by the flow controller 418. The flow controller 418 may check the status of the cache 116 and prevent cache overrun by triggering an overflowprotection status. As used herein, the term "overflow protection status" means a logical or operational state in which cache overrun is prevented by throttling or metering the flow of data to the cache 116. In an embodiment, a data block is received at step 1102. The number of accessed cache lines is calculated as the inter-request arrival time divided by the average cache line access latency, as shown at 1104. At 1106, the remaining cache lines are calculated by adding the number of access cache lines to the number of previously remaining cache lines 1106. An example of this is seen in the second status 1004 of FIG. 10.

A cache protection status may be triggered to prevent overrun of the cache. Rather than writing the entire data block to the cache, the block may be broken down into sub-blocks of suitable size for communicating to the cache, based on the number of remaining cache lines. If required, the cache protection status may cause the sub-blocks to be written sequentially, or spaced to prevent cache overrun. In a further embodiment, the cache protection status may cause the data block to be written to memory 108, instead of the cache 116. Accordingly, at 1108, a determination is made as to whether the remaining cache lines are greater than the total reserved cache lines. If so, then the remaining cache lines are equal to the total reserve cache lines as shown at 1110. If not, then a determination is made as to whether the number of sub-blocks in the cache lines is less than the remaining cache lines at 1112. If so, then the remaining cache lines is calculated as the original number of remaining cache lines minus the number of sub-blocks in cache lines as shown at 1114. If not, then the calculations are performed in a loop until the number of sub-blocks in the cache lines is less than the remaining cache lines.

Figure 12:
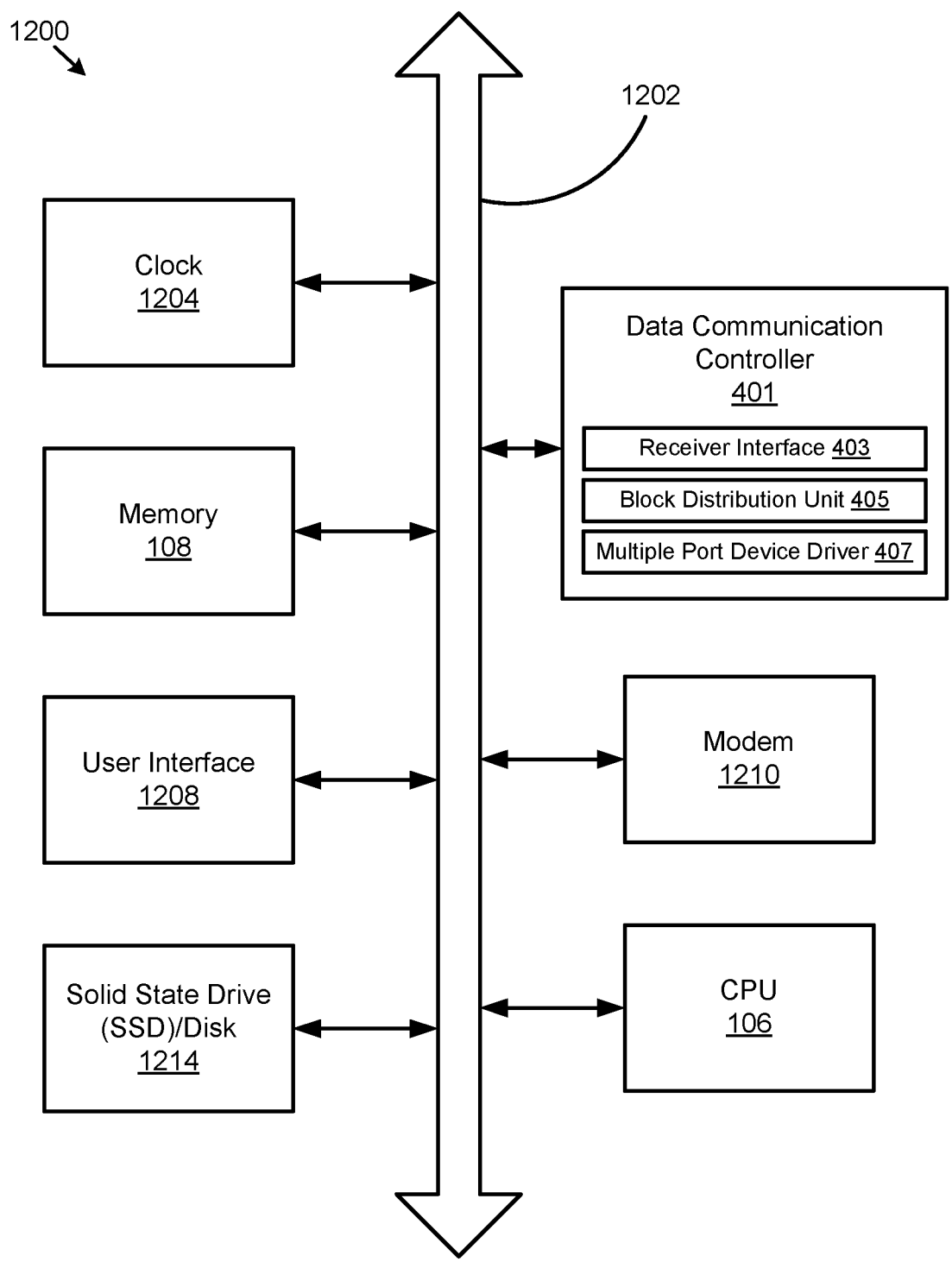
FIG. 12 is a block diagram of a computing system specially configured according to the present embodiments.

FIG. 12 is a block diagram of a computing system 1200 including the PCIe data communication controller 401, including the receiver interface 403, the block distribution unit 405, and the multiple port device driver 407 of FIG. 4. The computing system 1200 can include a clock 1204, memory 108, such as a random access memory (RAM), a user interface 1208, a modem 1210 such as a baseband chipset, a solid state drive/disk (SSD) 1214, and/or a CPU 106, any or all of which may be electrically coupled to a system bus 1202. The computing system 1200 can include the PCIe data communication controller 401, including the receiver interface 403, the block distribution unit 405, and the multiple port device driver 407 of FIG. 4, which may also be electrically or logically coupled to the system bus 1202. The space compaction engine 145 can include or otherwise interface with the clock 1204, the memory 108, the user interface 1208, the modem 1210, the solid state drive/disk (SSD) 1214, and/or the CPU 106.

The present embodiments may include an arbitration or watchdog timer to prevent latency sensitive IO transactions, such as video streams, from overwhelming the IO queues. Thus performance booster IO requests will have opportunity to make forward progress. In addition, the embodiments may accommodate random (small random reads/writes) IO transactions as well.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

The invention claimed is:

1. A method for quality of service (QoS)-aware input/output (IO) management for a peripheral component interconnect express (PCIe) device, the method comprising:
receiving, in a receiver interface, an Input/Output (IO) request from a software application, the IO request comprising data and a data characteristic associated with the data for communicating the data over a data access port, the data characteristic providing an urgency for communicating the data over the data access port;
determining, in a transfer mode selector, a data transfer mode selection based on the data characteristic associated with the data for communicating the data over the data access port, the data transfer mode being selected being one of a throughput-oriented mode, a latency-sensitive mode, and a balanced mode; and
communicating, by a block distribution unit, the data over the data access port in response to the IO request, and according to the data transfer mode.

2. The method of claim 1, wherein the throughput-oriented mode is configured to communicate data with a throughput oriented (TO) block distributor over the data access port according to a Direct Memory Access (DMA) protocol.

3. The method of claim 1, wherein the latency-sensitive mode is configured to communicate data with a latency-sensitive (LS) block distributor over the data access port according to a Data Direct I/O (DDIO) protocol.

4. The method of claim 1, wherein the balanced mode is configured to selectably communicate data over the data access port according to either a Directed Memory Access (DMA) protocol or a Data Direct I/O (DDIO) protocol.

5. The method of claim 4, further comprising determining with a block identifier unit whether to communicate the data over the data access port according to the DMA protocol based on whether the urgency provided by the data characteristic indicates that data may not be accessed as soon as it is ready to be accessed, or the DDIO protocol based on whether the urgency provided by the data characteristic indicates that data is to be accessed as soon as the data is ready to be accessed.

6. The method of claim 4, further comprising determining whether to communicate the data over the data access port according to the DMA protocol or the DDIO protocol in response to a status of a cache configured to receive data according to the DDIO protocol, wherein the data is communicated according to the DMA protocol in response to a determination that the cache is in an overflow protection status.

7. The method of claim 1, further comprising:
configuring a first set of data access ports for communicating data according to a Direct Memory Access (DMA) protocol; and
configuring a second set of data access ports for communicating data according to a Data Direct IO (DDIO) protocol.

8. The method of claim 7, further comprising multiplexing communication of the data over the at least one of the first set of data access ports and the second set of data access ports according to the data transfer mode defined by the IO request.

9. The method of claim 1, wherein the device comprises storage system, and
wherein the data access port comprises a reconfigurable multi-port.

10. A system for quality of service (QoS)-aware input/output (IO) management, comprising:
a data communication controller comprising:
a receiver interface configured to receive an Input/Output (IO) request from a software application, the IO request comprising data and a data characteristic associated with the data for communicating the data over a data access port, the data characteristic providing an urgency for communicating the data over the data access port;
a transfer mode selector coupled to the receiver interface and configured to determine a data transfer mode selection based on the data characteristic associated with the data for communicating the data over the data access port, the data transfer mode being selected being one of a throughput-oriented mode, a latency-sensitive mode, and a balanced mode; and
a block distribution unit configured to communicate the data over the data access port in response to the IO request, and according to the data transfer mode; and
a data access port coupled to the data communication controller, the data access port configured to communicate the data to a peripheral device over a peripheral component interconnect bus.

11. The system of claim 10, wherein the throughput-oriented mode is configured to communicate data over the data access port according to a Direct Memory Access (DMA) protocol.

12. The system of claim 10, wherein the latency-sensitive mode is configured to communicate data over the data access port according to a Data Direct I/O (DDIO) protocol.

13. The system of claim 10, wherein the balanced mode is configured to selectably communicate data over the data access port according to either a Directed Memory Access (DMA) protocol or a Data Direct I/O (DDIO) protocol.

14. The system of claim 13, wherein the data communication controller is further configured to determine whether to communicate the data over the data access port according to the DMA protocol based on whether the urgency provided by the data characteristic indicates that data may not be accessed as soon as it is ready to be accessed, or the DDIO protocol based on whether the urgency provided by the data characteristic indicates that data is to be accessed as soon as the data is ready to be accessed.

15. The system of claim 13, wherein the data communication controller is further configured to determine whether to communicate the data over the data access port according to the DMA protocol or the DDIO protocol in response to a status of a cache configured to receive data according to the DDIO protocol, wherein the data is communicated according to the DMA protocol in response to a determination that the cache is in an overflow protection status.

16. The system of claim 10, wherein the data communication controller:
configures a first set of data access ports for communicating data according to a Direct Memory Access (DMA) protocol; and
configures a second set of data access ports for communicating data according to a Data Direct IO (DDIO) protocol.

17. The system of claim 16, wherein the data communication controller is further configured to multiplex communication of the data over the at least one of the first set of data access ports and the second set of data access ports according to the transfer mode.

18. An apparatus for quality of service (QoS)-aware input/output (IO) management for a peripheral component interconnect express (PCIe) system, comprising:
a receiver interface configured to receive an Input/Output (IO) request from a software application, the IO request comprising data and a data characteristic associated with the data for communicating the data over a data access port, the data characteristic providing an urgency for communicating the data over the data access port;
a transfer mode selector coupled to the receiver interface and configured to determine a data transfer mode selection based on the data characteristic associated with the data for communicating the data over the data access port, the data transfer mode being selected being one of a throughput-oriented mode, a latency-sensitive mode, and a balanced mode; and
a block distribution unit configured to communicate the data over the data access port in response to the IO request, and according to the data transfer mode.

19. The apparatus of claim 18, wherein:
the throughput-oriented mode is configured to communicate data over the data access port according to a Direct Memory Access (DMA) protocol based on whether the urgency provided by the data characteristic indicates that data may not be accessed as soon as it is ready to be accessed;
the latency-sensitive mode is configured to communicate data over the data access port according to a Data Direct I/O (DDIO) protocol based on whether the urgency provided by the data characteristic indicates that data is to be accessed as soon as the data is ready to be accessed; and
the balanced mode is configured to selectably communicate data over the data access port according to either a Directed Memory Access (DMA) protocol or a Data Direct I/O (DDIO) protocol.

20. The apparatus of claim 18, wherein the system comprises a storage system, and
wherein the data access port comprises a reconfigurable multi-port.

* * * * *